United States Patent [19]

Morris

[11] 4,388,188
[45] Jun. 14, 1983

[54] OIL SPILL RECOVERY MEANS

[76] Inventor: Robert D. Morris, 93 Kickimuit Ave., Bristol, R.I. 02809

[21] Appl. No.: 253,281

[22] Filed: Apr. 13, 1981

[51] Int. Cl.³ .................... B01D 21/00; E02B 15/04
[52] U.S. Cl. .............................. 210/242.3; 210/923; 405/71; 405/72
[58] Field of Search ............... 405/63, 70, 71, 72; 210/242.3, 923

[56] References Cited

U.S. PATENT DOCUMENTS

| | | | |
|---|---|---|---|
| 2,228,529 | 1/1941 | Mieller | 405/70 |
| 3,576,108 | 4/1971 | Rowland | 405/70 |
| 3,590,584 | 7/1971 | Fitzgerald | 405/63 |
| 3,628,665 | 12/1971 | Bahher | 405/71 |
| 3,651,647 | 3/1972 | Flaviani | 405/71 |
| 3,662,891 | 5/1972 | Headrick | 210/923 |
| 3,686,870 | 8/1972 | Blomberg | 405/70 |
| 3,688,506 | 9/1972 | Marcocchio | 405/63 |
| 3,751,925 | 8/1973 | Thurman | 405/63 |
| 3,771,662 | 11/1973 | Muramatsu et al. | 210/923 |
| 3,868,824 | 3/1975 | Thurman | 405/71 |
| 4,006,082 | 2/1977 | Irons | 405/63 X |
| 4,116,833 | 9/1978 | Stagemeyer et al. | 210/923 X |
| 4,133,765 | 1/1979 | Stupica | 405/63 X |
| 4,208,287 | 6/1980 | Brieck | 210/923 X |
| 4,271,017 | 6/1981 | Milgram | 210/923 X |

FOREIGN PATENT DOCUMENTS 2230942  4/1973  Fed. Rep. of Germany ........ 405/63

Primary Examiner—Robert H. Spitzer
Attorney, Agent, or Firm—Dahlen & Gatewood

[57] ABSTRACT

Apparatus for confining an oil slick on the open seas and for skimming the oil from the ocean's surface and funneling it into a floating barge wherein the oil is separated for later processing. Oil is confined in an inverted triangular-shaped area by two flotatable booms each made up of a plurality of individual flotatable sections connected together. Thus, the booms can undulate in up and down fashion with the action of the waves. Oil and water is skimmed from the confined ocean's surface by a catcher and is funneled by the catcher into a flotatable oil recovery barge for later processing of the oil separated from the ocean water.

13 Claims, 9 Drawing Figures

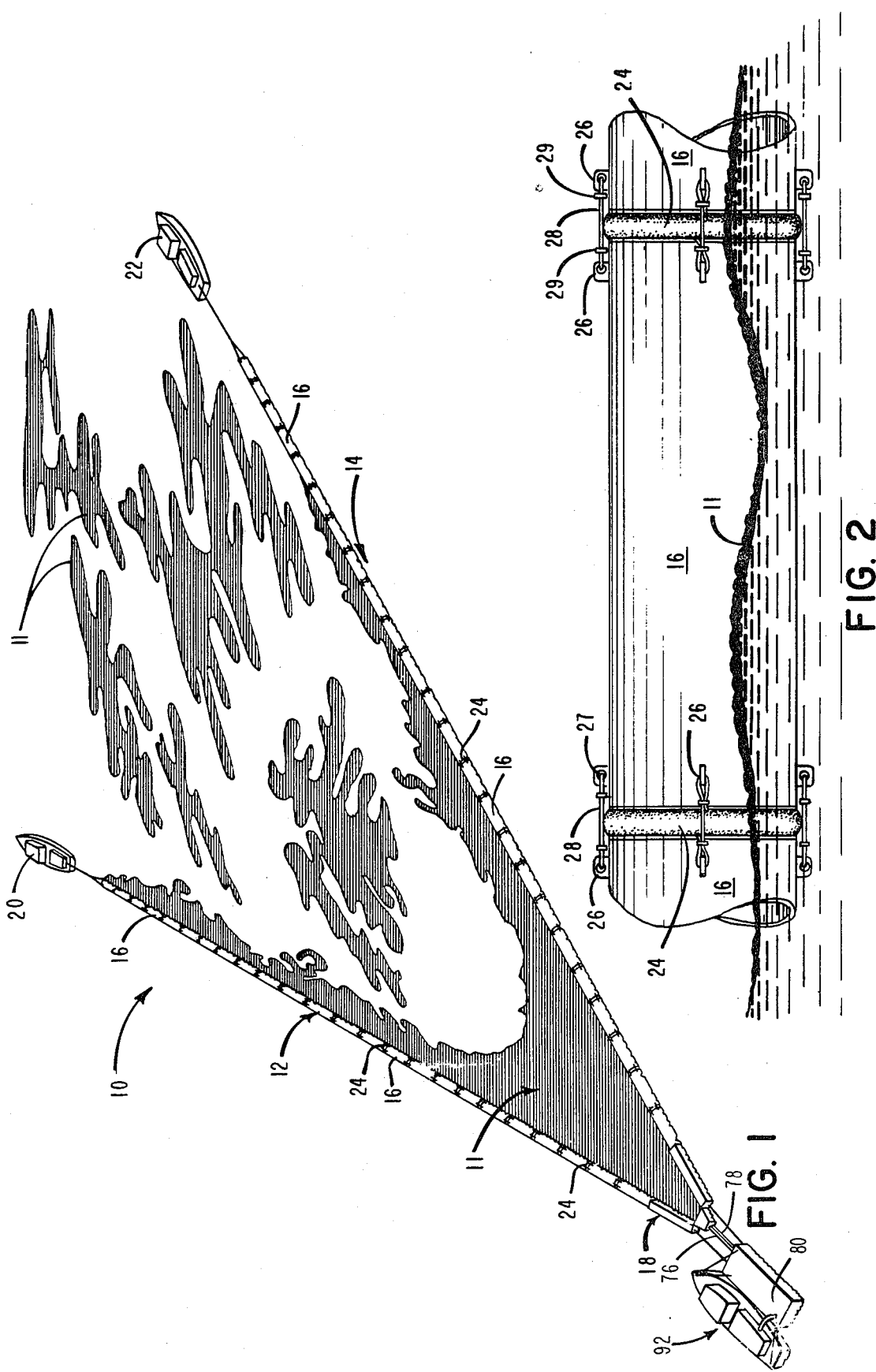

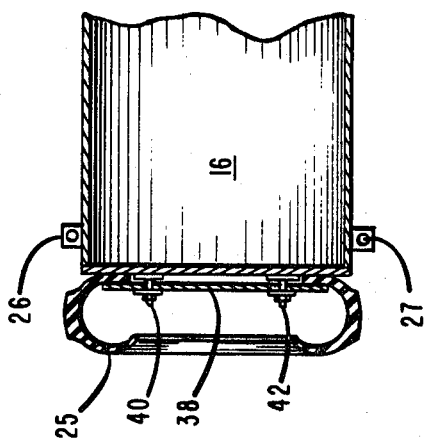
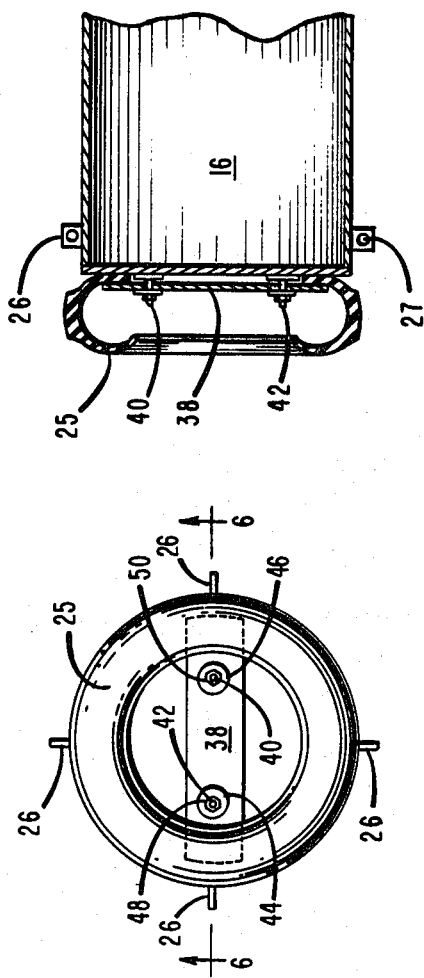
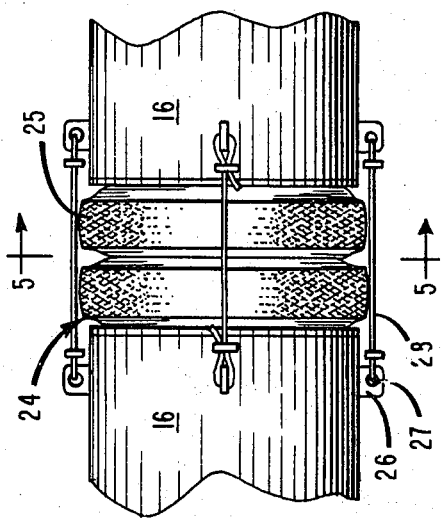
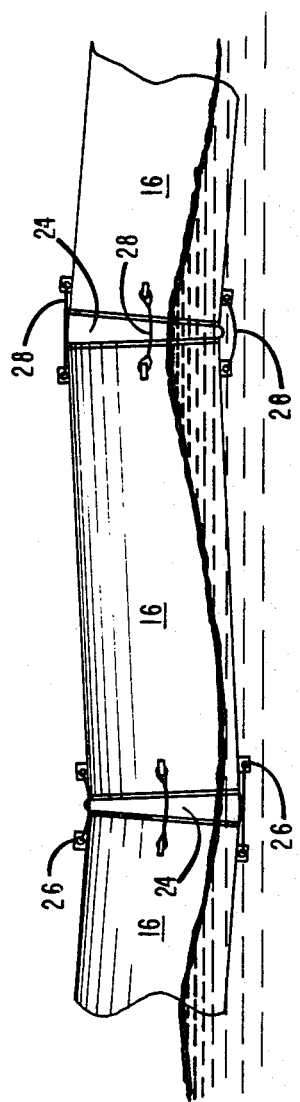
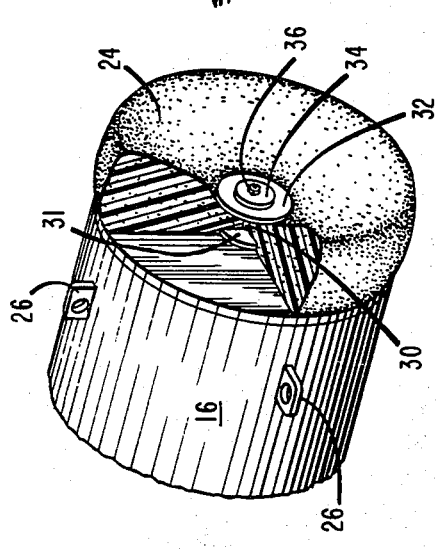

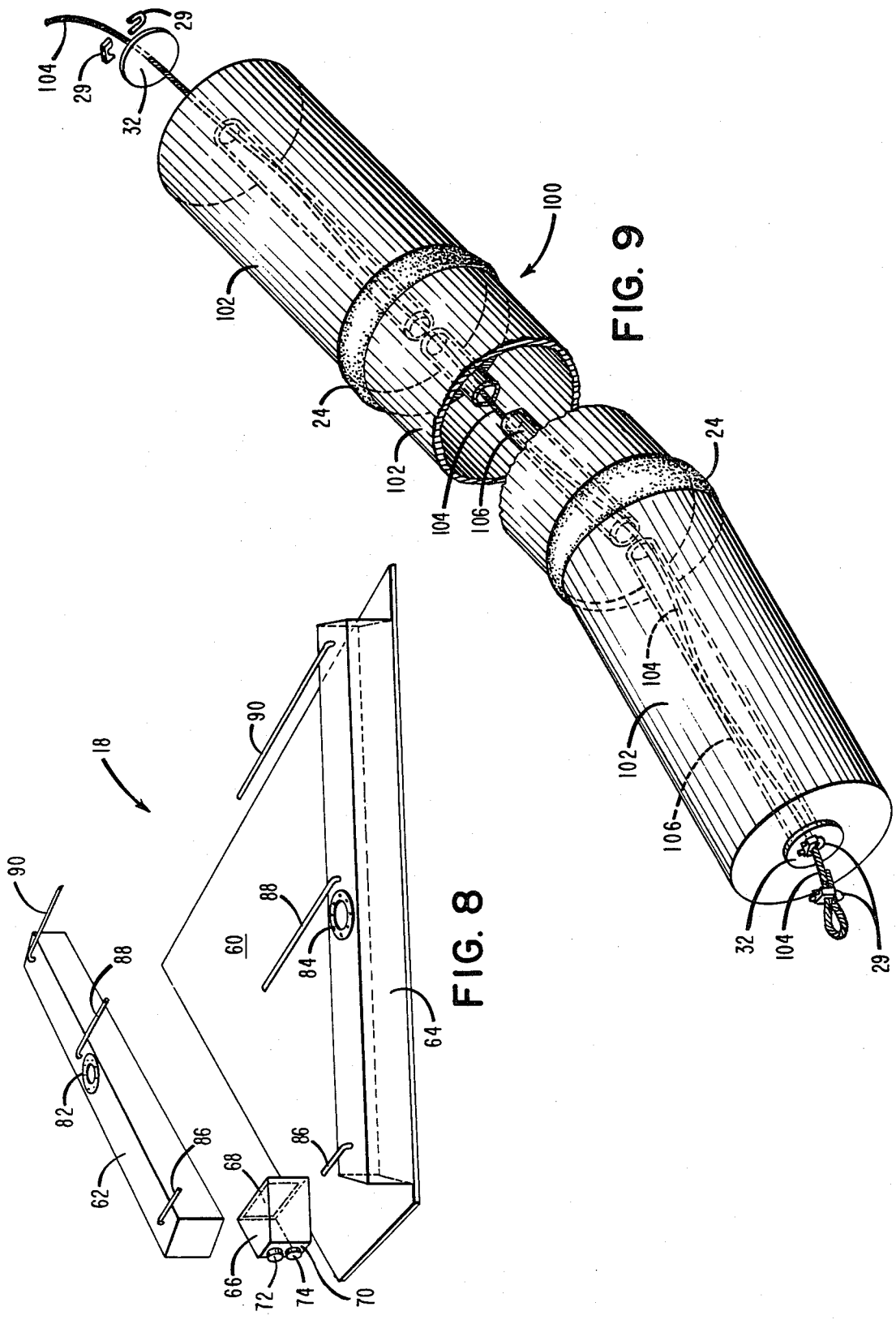

OIL SPILL RECOVERY MEANS

BACKGROUND OF THE INVENTION (1) Field of the Invention

The present invention relates to an apparatus for confining an oil slick on the surface of a large body of water and for skimming that oil slick from the water's surface and funneling a mixture of oil and water into a recovery means for separation of the oil from the water so that the oil can be later processed.

(2) Description of the Prior Art

Over the last several years, oil spills from tankers running aground or otherwise damaged on the open ocean have become of increased concern due to the pollution damage caused to beaches and the killing of marine and other wildlife that frequents the shorelines and ocean. Of concern also is the frequent occurrence in off-shore oil drilling operations for leaks to develop under the ocean's surface and for oil to be spewed up to the surface and subsequently by the wave action to be drawn onto adjacent beaches.

As a result of this ever continuing potential for pollution, numerous devices have been developed to remove an oil slick from the ocean's surface, as well as other large bodies of water, such as inland lakes and rivers. Representative of various devices that have been developed are disclosed in U.S. Pat. Nos. 3,219,190; 3,348,690; 3,662,891; and 3,688,506.

In general, oil slick recovery devices developed heretofore have comprised floating booms of various construction which are attached in a V-shaped fashion at one end to a "skimmer" of some sort which skims the oil slick from the water's surface. Various boom constructions have been disclosed, such as the floating fences disclosed in U.S. Pat. No. 3,219,190 and the wooden beam booms or hollow metal pontoons in U.S. Pat. No. 3,348,690. The booms in U.S. Pat. No. 3,688,506 comprise upright walls connected together in series fashion, the walls each being provided with float means such as out-riggers so as to hold the walls in upright position during usage. Adjacent walls as shown in that patent are interconnected by a pliant plastic strip. U.S. Pat. No. 3,662,891 discloses a floating boom comprising a cluster of parallel elongated air and water tubes which are flexible over their entire length and, according to the patentee, essentially insensitive to wave action.

Although oil recovery devices known heretofore have been satisfactory to some degree, their use has not been without certain problems. One constant difficulty associated with known fence-type booms is their tendency to roll over and to be twisted with wave action, particularly with rough, rolling seas. As a result various outriggers and the like floats have been incorporated with the fences to keep the fences floating in an upright position. Otherwise there is a tendency for the oil slick to leak underneath the fence or even sometimes to pass over it if a large wave action is encountered. Nevertheless, to my knowledge, these booms of the fence-type construction still do not operate well in rolling seas.

Other booms though of cylindrical-shaped construction and of flexible material, e.g., elongated plastic tubes, do not have sufficient weight to resist wave action. As a result, their relative lightness allows an oil slick to leak underneath the boom at times. Some booms, e.g. wooden beam booms, are just too inflexible to be insensitive to wave action. As a result, one portion of the boom may be hit so hard with a wave that it causes another portion to ride up or down in the water, allowing the oil slick to pass under or over it.

SUMMARY OF THE INVENTION

It is therefore an object of the present invention to provide an apparatus for confining an oil slick and for skimming and funneling the oil slick and water into a recovery means for separation of the oil from the water, so that the oil can later be processed and recovered for use.

A further object of the invention is to provide an oil recovery apparatus which will provide more positive containment of an oil slick floating on the water's surface, allowing more complete recovery of the oil slick and less potential for pollution to adjacent beaches and injury to marine and wildlife.

These objects and others are attained according to the present invention in an apparatus comprising in association:

(a) Two elongated flotatable booms each comprising a plurality of individual cylindrical-shaped flotatable sections interconnected together in series yet being capable of independent movement of one another;

(b) A flotatable catcher connected to each of said flotatable booms at one end of each said boom, said booms capable of projecting forwardly of said catcher in a variable V-shaped pattern; and (c) Means connected to each said boom at its other end for maintaining the said booms in the desired V-shaped pattern.

Quite advantageously with use of the presently disclosed apparatus, rough and rolling seas will not stop recovery. The booms can be opened in a wide or narrow fashion depending upon the area over which the oil slick has dispersed. The booms direct the oil slick to an ever-narrowing area of confinement, permitting the oil slick to be more readily skimmed from the water's surface.

A further advantage of the present invention is that the oil and water is separated from one another to a large extent in a floating oil recovery barge, at the location the oil slick is skimmed from the water's surface. This recovered oil still containing some water can then be further processed to recover the oil for use again. Thus, the recovered oil not only results in removing a potential pollutant from the environment but a profit incentive to the recovery system.

BRIEF DESCRIPTION OF THE DRAWING

FIG. 1 is a schematic view of an apparatus according to the invention showing its use in confining an oil slick and skimming that oil slick from the water's surface, transferring it in turn to a floating oil barge for separation of the oil and water;

FIG. 2 is an enlarged view showing one section of one of the flotatable booms shown in FIG. 1 showing confinement of the oil slick;

FIG. 3 is a perspective view of a portion of one of the flotatable sections of the boom shown in FIG. 1 showing the compressible means located between next adjacent flotatable sections;

FIG. 4 is a side view of a portion of next adjacent flotatable sections of the boom shown in FIGS. 1 and 2, showing alternative compressible means between the two sections;

FIG. 5 is an end view of one of the flotatable sections shown in section FIG. 6, showing attachment of the compressible means to the end of the section;

FIG. 6 is a side sectional view showing attachment of the compressible means to the end of the flotatable, hollow, cylindrical section of the boom;

FIG. 7 is a side view showing the undulating movement of a portion of the boom shown in FIG. 1;

FIG. 8 is an exploded perspective view of the flotatable catcher used to skim the oil slick from the water's surface and to funnel it into the oil recovery barge; and FIG. 9 is a side view of an undulating boom according to the invention, showing an alternative means of interconnecting the boom sections together.

DETAILED DESCRIPTION OF THE INVENTION AND THE PREFERRED EMBODIMENTS

Turning now to the drawings, there is shown in FIG. 1 thereof, an apparatus generally indicated by reference numeral 10 for confining an oil slick 11 and for skimming oil and water from the water's surface for later recovery of the oil. As shown in FIG. 1, apparatus 10 comprises two elongated flotatable booms 12, 14, each comprising a plurality of individual flotatable sections 16, interconnected together in a head-to-foot fashion to provide a boom of a desired length, the booms each being connected at their one end to a catcher or funnel 18, and at their other ends to respective powered vessels such as tug boats 20, 22.

Flotatable sections 16, as will be seen from the drawing, are of a cylindrical-shape, thus providing good stability in open, rolling seas. The cylindrical-shape of the individual flotatable sections provides less tendency for tides and wave action to cause twisting of the elongated boom, particularly in view of the fact that the boom comprises individual sections capable of somewhat independent movement of each other, as will be hereinafter more fully described. These cylindrical-shaped flotatable sections can be of various lengths and diameter; however, the ratio of the length to diameter (L/D) should preferably be less than 3:1 for convenience of handling. In more calm water, the L/D ratio of the flotatable sections can be less, e.g., about 1 and ½:1, in which case conventional 55 gallon steel drums will be found quite satisfactory in the practice of the invention. However, in some cases it may even be desirable to provide a boom with individual flotatable sections having a mixture of L/D ratios, thus providing, e.g., greater flexibility inwardly of the ends than closer to the ends of the boom. Where greater wave height and rolling seas are to be encountered, flotatable sections of greater diameter should preferably be used, e.g., a hollow-sealed cylindrical-shaped drum of ¾ inch steel, 12 feet×4 feet. Flotatable sections of shorter length, regardless of the diameter, will in general provide a boom of somewhat greater flexibility and undulating up-and-down motion.

Whatever the size flotatable section used in the practice of the invention, flotatable sections of metal are most desired, as these will provide the desired flotation, yet be submerged sufficiently below the water's surface to prevent leakage of oil under the boom. In general, the bottom of the flotatable section should be submerged several inches below the water's surface, sufficient to offer a barrier to passage of the oil slick. When of metal, the flotatable sections can be coated, if desired, with various known materials, e.g., conventional synthetic rubber coating materials, to provide resistance to sea water corrosion.

As will be seen by reference to FIG. 2 of the drawing, a cylindrical-shaped compressible means 24, is located between each two next adjacent flotatable sections 16, the purpose for which will later be made clear. Adjacent the ends on each flotatable section 16 are provided a plurality of cable cleats indicated generally by reference numeral 26, for attachment of the ends of elongated flexible members identified by reference numeral 28, e.g., conventional ½ inch diameter steel cables 24 inches long. The ends of each steel cable are passed through the eye 27 of the cable cleat and clamped to its standing length according to usual fashion by a cable clamp denoted by reference numeral 29.

Two cable cleats 26 are located on each end of the flotatable section 16 in diametrically opposed fashion, top and bottom, and two other cleats 26, as shown, are located on the sides of the flotatable section diametrically opposed to one another. It will be appreciated that these imaginary diameters intersect with one another at a 90° angle. Thus, the two next adjacent flotatable sections are interconnected together in head-to-foot fashion at 4 different points, and in such a manner, as to permit movement of one section relative to the other. While a greater number of cable connections can be provided, if desired, 4 will be found entirely satisfactory for most purposes, providing also somewhat greater independence of action than where a large number of connections are made. However, a lesser number of connections is less desired as the desired undulating movement of the boom will not be readily attained. And, moreover, less support will be offered for containment of the compressible means.

Compressible means 24, as will be seen by reference to FIG. 3, is fixedly attached to a flotatable section 16 at one end. This is accomplished by means of studs 30 which extends perpendicularly outwardly from disk-shaped base 31 welded or otherwise permanently secured to the end of the flotatable section 16 and which passes through the geometric center of the cylindrical-shaped compressible means. Compressible means 24 is made secure to flotatable section 16 by annular-shaped members 32,34, concentric with compressible means 24 and which are held in location on stud 30 by means of lock nut 36. These annular-shaped members can be of various outside diameter, depending somewhat on the diameter of the flotatable section 16. However, in general, for a 4 foot diameter flotatable section 16, member 32 will have a diameter of about 12 inches and member 34, a diameter about 6 inches. The diameter of the center hole in each will be only large enough to accommodate stud 30.

Stud 30, as will be appreciated, must be of somewhat less length than the thickness of compressible means 24 to allow the compressible means 24 in operation to be compressed, as desired, particularly adjacent to its outer perimeter. Thus, the central portion of compressible means 24 will necessarily be compressed to allow for fastening of lock nut 36 to stud 30.

Compressible mean 24 can obviously be of various compressible materials, e.g., various foam materials. However, a dense polyurethane foam or other hydrophobic closed-cell cellular material will be found most satisfactory. Thus, providing the compressible means of such a material the compressible means will tend not to absorb the ocean water as readily, leaving the compressible means somewhat more lively. The density of the foam material used can vary somewhat depending upon the thickness of the compressible means. However, the density of the compressible means should not be such that it will bottom out in use. By this it is meant that the foam material should resist compression at the forces encountered so that the ends of the adjacent flotatable sections will not impact against one another. Obviously, the compressible means should resist deterioration in salt water and be tough enough to withstand repeated compression and tearing forces between two adjacent flotatable sections. Thus, it may be desirable to reinforce the compressible means according to conventional techniques. For example, during manufacture of the compressible means, layers of woven fabric can be incorporated in laminar fashion. Another means of providing reinforcement to compressible means 24 is to encapsulate it in a cylinder or sock of loosely woven fabric having resistance to salt water.

Although in the drawing the compressible means is disclosed as being fastened to only one end of a flotatable section 16, obviously a compressible means can be fastened to both ends, if desired. In some cases, it may even be more desirable to have a thinner compressible means attached to both ends of a flotatable section than a thicker compressible means attached to only one end, particularly as the thicker foam compressible means must be compressed in the center for fastening to stud 30 without excessive deformation at the outer perimeters.

As seen in the drawing, cylindrical-shaped compressible means 24 should be preferably of slightly larger diameter than the diameter of the flotatable section. Thus, compression can occur at the perimeter of the compressible means without danger of the perimeter of adjacent flotatable sections impacting against one another. In any event, compressible means 24 should not be of lesser diameter than the diameter of flotatable section 16, to avoid possible leakage of the oil slick past the boom.

One compressible means which will be found suitable for use with 55 gallon drum flotatable sections are conventional motor vehicle tires, as is shown in FIG. 4 of the drawing. Thus, an automobile tire 25 is provided on the head and foot ends of each individual flotatable section 16, the two adjacent sections being interconnected together to provide a flexible coupling of relative unitary construction. Tire 25 is fixedly secured to the end of the flotatable section 16 and is held in position by means of a rectangular-shaped plate 38 in which is provided appropriate openings for the passage of threaded studs 40, 42, extending perpendicularly outwardly from and welded to the end of flotatable section 16. Conventional washers 44, 46 are, in turn, backed up by lock nuts 48,50, to secure plate 38 in place. As will be appreciated in referring to FIG. 5 of the drawing, rectangular-shaped plate 38 can be of various widths as desired; however, its length should be such as to extend well beyond the inner diameter of the tire used, but not so great that it cannot be positioned within the tire as shown. Also, if desired, two or three rectangular plates of a more narrow width can be used rather than one of wider width.

Whether tires are used as the compressible means 24 or some other compressible material, e.g., a synthetic foam, the individual flotatable sections in a boom will move somewhat independently of one another as is shown in FIG. 7, providing a boom with undulating movement, the extent of which depends somewhat on the wave action encountered. The greater the wave action, the greater will be the undulating movement of the boom. As will be appreciated by reference to FIG. 7, when two next adjacent flotatable sections are encountered by a rising wave, these two sections will likewise move individually upwardly, their movement being restrained by upper cable 28. As a result, the opposite ends of the two flotatable sections tend to pivot downwardly toward one another, their downward movement being restrained somewhat by compressible means 24. The opposite action occurs as is shown in FIG. 7 when the two flotatable sections encounter a low point in the wave action. It will be appreciated, however, that although along the boom's length an undulating movement will be occurring it may not occur in exactly the same representative fashion shown in FIG. 7. For example, depending on the particular wave action involved, as well as the extent of the rolling seas, and the length of the individual flotatable sections, etc., several flotatable sections in series could be riding the crest of a wave. Nevertheless, the independent movement of each flotatable section in the boom allows it to react to the extent necessary to a particular wave action, yet be limited in that action somewhat by those sections to which its ends are connected, as well as those extending further outwardly from those immediate interconnections.

Booms 12, 14 are connected to, and project forwardly of, flotatable catcher 18 in a V-shaped pattern, and cause the oil slick 11 to be confined and contained within a certain predetermined area for easier skimming and recovery from the ocean's surface. As will be appreciated by reference to FIG. 1, booms 12,14 are towed by vessels 20,22, e.g., tugboats, and these vessels can be operated to provide as wide or narrow a diverging path for the booms as needed to contain the particular oil slick 11. Catcher 18, as will be seen by reference to FIG. 8, comprises a trapezoidal-shaped bottom plate 60, supported by cubic-shaped pontoons 62,64, resting on and welded, or otherwise secured to bottom plate 60 at its outer edge as shown. Interconnected to pontoons, 62,64, at their one end and supported on the rear end of the bottom plate is funnel end 66, open at its front end 68 for entry of the oil-water skimmed from the ocean's surface. In the rear plate 70 closing the end of funnel end 66 are provided vertically spaced-apart exit or discharge openings, 72,74, for the discharge of oil/water from catcher 18 and transfer thereof by flexible conduits, 76,78, into oil recovery barge 80.

Bottom plate 60 can be provided of various sizes; however, a bottom plate having a wide front edge 18 feet in length, a narrow rear edge 3 feet, and sides 24 feet in length, will be found quite satisfactory. Pontoons 62,64 in this case will be about 6 feet × 6 feet, the length of which will depend to some extent on the length of the side of funnel end 66. However, the open end 68 in the front of funnel end 66 should be about 6 feet × 8 feet to allow for free flow and recovery of the oil/water from the ocean's surface. As will be appreciated, however, the size of catcher 18 can be varied considerably, as desired, to provide the intended function. Where the pontoons and funnel end are connected to the bottom plate, e.g., by welding or otherwise, a seal will be provided to contain the oil, preventing any escape of the oil/water except through discharge openings 72,74. Although not shown in the drawings, pontoons 62,64 which are, of course, air tight, can be provided in usual fashion with internal reinforcement such as angle-iron ribs or the like, located along their length and cross-section skeletal in configuration. Pontoons 62,64 can be provided with appropriate hatch covers 82,84 of conventional fashion, if desired, or constructed without. Interconnecting the pontoons together and offering reinforcing support for catcher 18 are cross-bars 86,88,90. The bottom plate 60, as well as pontoons 62,64, and funnel end 68 can be constructed of ¼ inch steel plate. Although not shown in the drawings, it will be appreciated that the ends of the booms 12,14 can be connected to the front ends of pontoons 62,64 in the same manner as are two next adjacent flotatable sections connected together. Also, if desired, a canvas top or canopy of trapezoidal shape, like the shape of bottom plate 60, can be provided, if desired. Such a canopy can be fastened at its edges to the outer edges of the pontoons, according to conventional technique. Thus, oil collected by catcher 18 will be even less likely to spill over or splash out of catcher 18, making for an even better and more positive recovery.

In practice, as is shown in FIG. 1, booms 12, 14 cause the oil slick 11 to be confined to an ever-narrowing inverted triangular-shaped area. At its narrowest end, the oil slick is encountered by the widest or front end of catcher 18, which is submerged below the water's surface sufficiently to skim off the oil slick from the water. The depth at which bottom plate 18 is submerged below the water's surface will depend to some extent upon the buoyancy provided by pontoons 62,64. The greater the bottom plate is submerged, as will be appreciated, the greater will be the amount of water skimmed off the ocean's surface along with the oil slick, producing an extra load not only upon catcher 18 but also upon the oil recovery means to which the oil/water is transferred. Thus, the buoyancy provided by pontoons 62,64 should only allow bottom plate 60 to be submerged below the water's edge to a depth sufficient to skim off the oil slick floating on the water's surface. In general, the bottom plate will be submerged 3-6 inches below the water's surface to insure complete skimming of the oil slick.

As catcher 18 skims the oil slick 11 from the water's surface, the oil/water skimmed off passes out the catcher rear funnel end 66 to oil recovery barge 80. To control the discharge from catcher 18, the exit discharge openings can be provided with appropriate conventional pressure release valves (not shown). Thus, when catcher 18 contains a sufficient volume of oil/water, these valves will operate to open and discharge into the oil recovery barge.

Oil recovery barge 80 is designed to separate the water from the oil skimmed off by catcher 18 and to hold the oil in the barge for later transfer and subsequent processing. Thus, the oil recovered can be pumped at intervals, as desired, into a recovery vessel denoted generally by reference numeral 92, or a loaded flotatable barge 80 can be replaced with another one previously pumped out and floated into place, appropriate connections being made to catcher 18.

Oil recovery barge 80 is designed to take the discharge from catcher 18 at its front end, near the top of the barge. Outlets are located at the bottom of the barge's stern to allow sea water to be discharged. And an outlet is also provided at the stern for attachment of a pump or suction line, for discharge of the oil separated-out in the barge from the sea water. Thus, the oil/water entering into the oil recovery barge 80 is allowed to flow toward the stern during which the oil and water separate, the oil flowing to the top to be held in the barge while the water is separated out to the bottom. This separation is aided by planar rectangular-shaped baffle plates in which are provided numerous vertical and horizontal rows of openings. These baffle plates are located front-to-back of the oil recovery barge. The baffle plates can be slanted, if desired, toward the front of the barge, offering more positive separation and breaking up of the oil/water into two layers.

Oil recovery barge 80 can be of various sizes as desired; in general, however, the barge will be of ¼ inch steel plate having a trapezoidal-shaped construction, being 50 feet in length at the top and 45 feet in length at the bottom. Such a barge will be 15 feet across and 10 feet deep from top to bottom. In this case, two baffle plates will be found satisfactory, each being located at 16.5 feet from respective ends of the barge. The barge can be provided with sealed compartments along the length at its edges to provide suitable flotation. Concrete slabs can be attached along the length of the barge at the sides to provide for better stability against rolling seas, and to make for the best flotation of the barge.

The barge's inlets and outlets, as can the exit discharge openings 72,74 of catcher 18, can be provided with positive shutoff valves so that an oil recovery barge can be disconnected from catcher 18 and replaced with another. Full barges can then be towed by a suitable vessel to a dock for pumping out of the oil for subsequent processing and recovery. If the oil is too thick to pump, a steam line can be connected to the intake valve at the front of the barge to lighten the oil so pumping can be accomplished. In general, oil spilled on the ocean's surface or leaking from an off-shore drilling operation becomes thickened as it floats in the water.

Referring now to FIG. 9, there is disclosed a further and alternative embodiment of a boom 100, comprising individual flotatable sections 102, connected together by a single cable 104, running the length of the boom. As shown in the drawing, each flotatable section 102 comprises a hollow sealed steel cylinder having a pipe 106 extending longitudinally down the center line thereof, the ends of which are open to allow passage of cable 104. Between each two next adjacent flotatable sections is located a compressible means 24, as before-described. One end of cable 104 is attached to a towing vessel, e.g., vessel 20, while the other end is attached to, for example pontoon 62. As will be appreciated, where the end of cable 104 is attached to pontoon 62, compressible means may be of a different type, to facilitate attachment of cable 104 to the pontoon. For example, compressible means 24 in this case may be a large coil spring, or a plurality of smaller springs dispersed in annular fashion to prevent impact of the end of the adjacent flotatable section with the pontoon. In some cases, compressible means 24 can be omitted at this location, so long as a canvas tubular-shaped sleeve is interconnected with the end of the pontoon and the foot of the flotatable section, to prevent oil leaking under the boom at this location.

As will be appreciated from the above, the boom sections are designed to work up and down with a rolling sea. The height of the waves does not matter as much as the chop or shortness of the wave length. With the intermediate compressible means, the boom sections can more or less adjust to the wave action involved, resulting in the boom holding its depth and preventing oil leakage under the boom and spill over the top.

The towing speed of the boom should be up to a top speed of about 5 knots on calm sea conditions, and 1 knot or held open with unfavorable sea conditions. While the apparatus of the present invention has been designed specifically for the open seas, it will be appreciated that it can be utilized in any body of water, e.g., large inland lakes, rivers, and particularly rivers emptying into the ocean. Oil as well as all other pollution floating on the water's surface can be caught and sent down the center of the floating booms to the catcher and then stored in a containment barge for later recovery. In a running stream of water such as a river, the floating booms can be attached to opposite sides of the river in upstream locations and maintained in fixed location.

As will be appreciated, the larger the diameter of the flotatable sections, the better the boom will be able to better contain the oil slick in severe weather conditions. The ability to contain the oil slick between the booms may well lessen somewhat but will not prevent the substantial recovery of oil even when the sea reaches gale force conditions. Thus, oil recovery apparatus in accordance with the invention will continue to contain and recover oil regardless of wave height encountered.

Depending on sea conditions, adjustment between the two vessels towing the booms can be widened or brought in closer together. This will allow for better collection of the oil slick.

As many different embodiments of this invention will now have occurred to those skilled in the art, it is to be understood that the specific embodiments of the invention as presented herein are intended by way of illustration only and are not limiting on the invention, but that the limitations thereon can be determined only from the appended claims.

What I claim is:

1. Apparatus for confining an oil slick and for skimming and funneling oil and water into a recovery means for the oil comprising:
   (a) two elongated flotatable booms, each boom comprising a plurality of individual cylindrical-shaped flotatable sections interconnected together in series yet being capable of independent movement of one another;
   (b) cylindrical-shaped compressible means of a diameter at least as large as the boom sections being located between each two next adjacent interconnected flotatable boom sections whereby to provide a flexible coupling of boom sections and a boom of relative unitary construction thereby permitting the boom sections each to move independently of one another with wave action and preventing the leaking of the oil/water slick between boom sections, the said compressible means being of sufficient thickness and having sufficient resistance to compression as to prevent the ends of adjacent boom sections from impacting one another;
   (c) a flotatable catcher funnel connected to each of said flotatable booms at one end of each said boom which catcher funnel comprises a planar bottom of trapezoidal shape and pontoons attached to and flotatably supporting said bottom below the water's surface at a depth sufficient to recover any oil floating on the water's surface, said pontoons being located with respect to one another to provide a catcher funnel wider at its front end than at its rear end and confining the oil/water slick to an ever-narrowing inverted triangular-shaped area;
   (d) flotatable recovery means detachably connected to the rear end of said flotatable catcher funnel for receipt of the oil/water discharged from the said funnel and for separating the oil from the water; and
   (e) means connected to each said boom at its other end for maintaining the said booms forward of said catcher funnel in the desired pattern.

2. Apparatus for confining an oil slick and for skimming and funneling oil and water into a recovery means for the oil according to claim 1 wherein means are provided in association with each said flotatable section for interconnecting the head of one said section to the foot of the other next adjacent section whereby the series of said flotatable sections and compressible means provides a continuous elongated boom of desired length capable of undulating movement with the ocean waves.

3. Apparatus for confining an oil slick and for skimming and funneling oil and water into a recovery means for the oil according to claim 2 wherein said interconnection means comprises flexible elongated means interconnecting each next two adjacent flotatable sections.

4. Apparatus for confining an oil slick and for skimming and funneling oil and water into a recovery means for the oil according to claim 3 wherein said flexible elongated means comprises 4 predetermined equal length flexible cables and means are provided on each said flotatable section adjacent its end at 4 spaced-apart locations for anchoring the ends of said cables, said anchoring means being located on the boom sections in such a fashion that a first pair of diametrically opposed anchoring means is located at the top and bottom of each boom section, and a second pair is located diametrically 90° thereto.

5. Apparatus for confining an oil slick and for skimming and funneling oil and water into a recovery means for the oil according to claim 4 wherein said compressible means comprises a cylindrical-shaped foam member.

6. Apparatus for confining an oil slick and for skimming and funneling oil and water into a recovery means according to claim 2 wherein the interconnecting means comprises a continuous flexible cable extending longitudinally down the center line of each boom section, one end of which is attached to a towing vessel and the other end of which is attached to a pontoon.

7. Apparatus for confining an oil slick and for skimming and funneling oil and water into a recovery means for the oil according to claim 1 wherein pressure-release means are provided in the catcher at its rear end for controlling the flow of oil and water from the catcher into the oil recovery barge.

8. Apparatus for confining an oil slick and for skimming and funneling oil and water into a recovery means for the oil according to claim 1 wherein said means connected to each said boom is a means to tow the said apparatus through the water.

9. Apparatus for confining an oil slick and for skimming and funneling oil and water into a recovery means according to claim 1 wherein the said flotatable sections are hollow, sealed metal drums.

10. Apparatus for confining an oil slick and for skimming and funneling oil and water into a recovery means according to claim 9 wherein the length to diameter (L/D) of the said drums is no more than 3:1.

11. Apparatus for confining an oil slick and for skimming and funneling oil and water into a recovery means according to claim 10 wherein the said drums are each of ¾" steel and measure 12'×4'.

12. Apparatus for confining an oil slick and for skimming and funneling oil and water into a recovery means according to claim 1 wherein a trapezoidal shaped canopy is attached to the pontoons whereby to prevent oil/water in the catcher from being splashed out.

13. Apparatus for confining an oil slick and for skimming and funneling oil and water into a recovery means according to claim 1 wherein the flotatable recovery means comprises a plurality of rectangular-shaped baffle plates located front-to-back of the oil recovery barge, each said baffle plate being provided with a plurality of openings arranged in vertical and horizontal rows whereby as the oil/water discharged from the rear end of the catcher funnel into the oil recovery barge on flowing to its stern is separated into oil and water layers, the oil layer being on top for pumping into the recovery vessel.

* * * * *